United States Patent Office 3,223,724
Patented Dec. 14, 1965

3,223,724
PURIFICATION OF ALIPHATIC DINITRILES
Karl Adam, Ludwigshafen (Rhine)-Gartenstadt, and Wolfgang Arend, Reinhold Frick, and Hans Haas, Ludwigshafen (Rhine), Germany, assignors to Badische Anilin- & Soda-Fabrik Aktiengesellschaft, Ludwigshafen (Rhine), Germany
No Drawing. Filed Nov. 1, 1960, Ser. No. 66,430
Claims priority, application Germany, Nov. 7, 1959, B 55,450
7 Claims. (Cl. 260—465.8)

This invention relates to a new process for the purification of aliphatic dinitriles.

Aliphatic dinitriles may be converted by hydrogenation into the corresponding diamines which are known to be valuable initial materials for the production of polyamides. For this purpose, however, only very pure diamines can be used because otherwise the polyamides will be of inferior quality and will in particular tend to discoloration. Pure diamines are however only obtainable from pure dinitriles. Technical dinitriles contain varying amounts of impurities which are sometimes difficult to remove by simple methods, such as distillation. Technical adipodinitrile, for example, which can be obtained from adipic acid and ammonia in the presence of dehydration catalysts or from 1,4-dichlorbutane and alkali cyanides, contains inter alia tetrahydrofurane, 1-chlorbutene - (3), butadiene - (1,3), allylacetonitrile, δ-chlorvaleronitrile, δ-hydroxyvaleronitrile, δ-hydroxyvaleric acid, adipic acid, adipamide, 2-cyanocyclopentanone and 2-cyanocyclopentene-(1)-yl-amine. Furthermore, other unknown compounds are contained in technical adipodinitrile. A particularly troublesome impurity is 2-cyanocyclopentene-(1)-yl-amine because in the hydrogenation process it is converted mainly into 2-aminomethylcyclopentylamine and aminomethylcyclopentane. These substances adversely affect the properties of polyamides, for example by causing premature chain termination in polycondensation. Polyamides containing the said substances tend to turn yellow and are useless for the production of fibers. 2-cyanocyclopentene-(1)-yl-amine and similar impurities can only be removed with difficulty by distillative methods.

The various impurities contained in other aliphatic dinitriles are less known in detail. In general, however, there are present the corresponding carboxylic acids, amide nitriles, acid amides as well as compounds which are known to contain imino and amino groups. In suberodinitrile, for example, amino and imino groups can be detected with the aid of the infra-red spectrum. Frequently, the technical dinitriles are so impure that even by repeated distillation they cannot be converted into a state which permits their continuous hydrogenation. Even in amounts of as little as 0.05%, the said impurities strongly interfere with the processing of the said dinitriles.

Various methods of purifying aliphatic dinitriles, in particular adipodinitrile, are known. For example, impurities which contain carbonyl or imino groups may be converted by reaction with N,N-dialkylhydrazines into the corresponding hydrazones which are difficultly volatile.

According to another proposal, impurities containing amino or hydroxyl groups are converted by reaction with phenylisocyanate into ureas or urethanes which are also difficultly volatile. A disadvantage of the said two methods is that the reaction products of the impurities (which remain in the residue) readily decompose, in particular at the high temperatures present in discontinuous purification toward the end of distillation, so that the distillation product is again contaminated. Moreover, the substances to be added are relatively difficultly accessible and some of them are unpleasant to handle.

According to another known process, crude adipodinitrile is treated at room temperature with aqueous solutions of sulfurous acid or its salts, such as ammonium bisulfite, and the carbonyl compounds are thus converted into the bisulfite adducts. It is a disadvantage of this method that, even by repeated washing of the dinitrile with water and/or ammonia solutions, complete removal of the sulfurous acid derivatives, which are injurious to the hydrogenation catalysts, is achieved only with difficulty. Moreover, the purifying effect with respect to 2-cyanocyclopentene-(1)-yl-amine, whose presence in adipodinitrile is most undesirable, is not fully satisfactory.

According to another known process the formation, on heating adipodinitrile, of undesirable impurities which decolorize potassium permanganate solution is reduced by the addition of ammonium biphosphate. In this process, which is carried out in the absence of water, removal of impurities already present is not however observed.

It is also known that impurities contained in adipodinitrile can be removed by treating the same with acids. A disadvantage of this method is the slimy, difficultly filterable precipitate which is formed, particularly when strong acids are used in excess. Moreover, in particular when strong acids are used, nitrile groups of the adipodinitrile are also saponified. Furthermore, there is considerable corrosion of the apparatus, again especially when strong acids are used. On the other hand, the purifying action of weak acids does not satisfy present-day high requirements. Furthermore, some of the acids recommended, for example hydrochloric acid, are catalyst poisons which cannot be completely removed prior to hydrogenation.

Finally, a process is known in which, subsequent to the acid treatment described in the preceding paragraph, the crude dinitrile is treated with ammonia and then washed with water or salt solutions. As far as the acid treatment is concerned, the above considerations apply. Moreover, this method comprises a plurality of stages and is therefore more troublesome than the process according to the present invention.

It is an object of the present invention to provide a process by which high-purity dinitriles can be obtained in a simple manner. It is another object of the invention to provide a process for the purification of dinitriles for which only readily accessible substances are required which are not, and do not produce, catalyst poisons. It is a further object of this invention to provide a process by which pure dinitriles are obtained, without an appreciable number of nitrile groups being saponified or corrosion occurring. Further objects of the invention will become apparent in the following description.

In accordance with this invention, we have found that the said objects are achieved by bringing dinitriles, in the presence of water, into contact with a bisulfate.

According to the new process, aliphatic dinitriles can be purified which, apart from the nitrile groups, have hydrocarbon structure and contain from 4 to 22 carbon atoms. The dinitriles may be straight-chained or branched, but must contain at least 2 carbon atoms between the nitrile groups.

Suitable initial materials include adipodinitrile, suberodinitrile, sebacodinitrile and the mixture of 1,9-dicyano-heptadecane and 1,10-dicyano-heptadecane known by the name of heptadecane dicarboxylic acid dinitrile. The crude dinitriles are prepared in the usual manner, for example by reaction of the corresponding dihalogen compounds with an alkali cyanide or by catalytic dehydration of the ammonium salts of the corresponding dicarboxylic acids. Another possibility for the production of dinitriles which can be purified according to this invention consists in telomerizing ethylene with the use of cyanogen chloride and reacting the ω-chlorcyanoalkanes thus obtained with an alkali cyanide.

Of the bisulfates, the cheap alkali bisulfates and ammonium bisulfate are preferred by reason of their good accessibility. The nature of the cation in the bisulfates is however not critical. Any other bisulfate may also be used. For example, the bisulfates of divalent metals which do not form sulfates difficultly soluble in water are well suited, such as iron bisulfate, manganese bisulfate, zinc bisulfate, cobalt bisulfate and nickel bisulfate. N-substituted ammonium bisulfates may also be used for the process according to the present invention. Of the said substances, those are preferred which contain from 1 to 3 lower alkyl radicals with 1 to 4 carbon atoms. It is not necessary to add a bisulfate as such. In its stead, solutions may be used which are obtained by adding to an aqueous sulfuric acid solution an equivalent of an oxide, hydroxide, carbonate or other compound capable of being converted into the bisulfate.

The amount of bisulfate to be added depends on the content of impurities in the initial material, and as a rule is 0.01 to 10% by weight, especially 0.1 to 5% by weight, with reference to the dinitrile. It is readily ascertained by way of a preliminary experiment what amount of bisulfate will give optimum purifying action with a given dinitrile.

The presence of water is essential for the success of the process. For example, the content of 2-cyanocyclopentene-(1)-yl-amine in crude adipodinitrile can thus be diminished considerably further than by treatment with a bisulfate alone. Water is advantageously used in amounts of 1 to 20% by weight, especially 3 to 8% by weight, with reference to the dinitrile. Obviously, it is also possible to use larger amounts of water, but working up of the mixture would thereby be made unnecessarily difficult. If the initial material contains water from the start, the amount of water to be added may be reduced accordingly or the addition of water may be dispensed with altogether.

Purification may be carried out at room temperature. In many cases it is recommendable to work at elevated temperatures, i.e., at temperatures of up to about 200° C., the reaction period thus being shortened accordingly. Temperatures above 200° C. should be avoided because of the formation of rapidly increasing amounts of undesirable byproducts, such as the above-mentioned 2-cyanocyclopentene-(1)-yl-amine which is formed from adipodinitrile. The process may, however, also be carried out at lower temperatures. The lower limit of temperature is determined by the solidification point of the dinitrile to be purified. In the case of adipodinitrile, for example, the said limit is about 0° C.

The process may be carried out, for example, by adding an aqueous solution of a bisulfate to the initial material and agitating the mixture for some time, e.g. for 60 to 180 minutes, at room temperature. Then the mixture is neutralized, for example by adding alkali carbonate, the readily filterable deposited solids are removed, and the filtrate is distilled. Neutralization of the reaction mixture is not absolutely necessary, but is recommended, especially if the process is carried out continuously on an industrial scale, in order to avoid major deposits of salts in the apparatus. Instead of adding a solution of a bisulfate, it is of course also possible to add water and the solid salt separately, or to use the solid salt alone if the crude dinitrile already contains sufficient water. Removal of the troublesome impurities and distillation of the crude product may be combined into one operation by carrying out distillation in a column and continuously adding to the initial material a bisulfate, preferably in the form of an aqueous solution.

The invention is further illustrated by the following examples, but the invention is not limited to these examples. The parts are by weight.

*Example 1*

150 parts of sodium bisulfate and 180 parts of water are added, at room temperature and while stirring, to 5000 parts of adipodinitrile having a pH-value of 10.1 and a content of 1.35% of 2-cyanocyclopentene-(1)-yl-amine. The mixture is agitated for 2 hours and then has a pH-value of 4.1. Then 25 parts of sodium carbonate are introduced, and after 10 minutes the precipitated salts are separated in a separator. The liquid mixture then has a pH-value of 6.8. 4750 parts of adipodinitrile with a content of 0.018% of 2-cyanocyclopentene-(1)-yl-amine are distilled off under reduced pressure.

The simplest manner of determining the content of 2-cyanocyclopentene-(1)-yl-amine consists in evaluating the infra-red spectrum of the mixture. Similar results are obtained by using, instead of sodium bisulfate and water, an aqueous dimethylammonium sulfate solution obtained from 242 parts of 40% sulfuric acid and 112.5 parts of a 40% dimethylamine solution. Instead of a dimethylammonium sulfate solution, an aqueous secondary butylammonium sulfate solution prepared from 327 parts of 30% sulfuric acid and 75 parts of secondary butylamine may be used with the same result.

*Example 2*

200 parts of adipodinitrile, which contain 0.24% of 2-cyanocyclopentene-(1)-yl-amine, are heated with 0.6 part of ammonium bisulfate and 10 parts of water for 3 minutes at 150° C., while stirring. After expelling the water, 190 parts of adipodinitrile (of the boiling point 165° C./15 mm. Hg and with a content of 0.002% of 2-cyanocyclopentene-(1)-yl-amine) are distilled off by way of a fractionating column. Similar results are obtained by using, instead of ammonium bisulfate and water, an iron bisulfate solution obtained by dissolving 0.575 part of iron(II) carbonate in 9.8 parts of 10% aqueous sulfuric acid. Instead of an iron bisulfate solution, a magnesium bisulfate solution prepared from 0.422 part of magnesium carbonate and 9.8 parts of 10% aqueous sulfuric acid may be used with the same result.

*Example 3*

200 parts of adipodinitrile with a content of 0.24% of 2-cyanocyclopentene-(1)-yl-amine, after the addition of 10 parts of water and 0.6 part of potassium bisulfate, are distilled by way of a fractionating column. The temperature in the distilling vessel is 193° to 194° C. and the pressure 40 mm. Hg absolute. 180 parts of adipodinitrile, which contains 0.004% of 2-cyanocyclopentene-(1)-yl-amine, are withdrawn at the top. The residue may be added to a fresh batch.

If the same initial material is distilled under the same conditions, but without the addition of water and potassium bisulfate, the resultant adipodinitrile contains as much as 0.19% of 2-cyanocyclopentene-(1)-yl-amine.

*Example 4*

150 parts of water and 30 parts of potassium bisulfate are added, while stirring, to 3000 parts of suberodinitrile with a pH-value of 12.1. Stirring is continued for 10 minutes at 100° C. The pH-value is then 5.55. The pH-value is adjusted to 6.8 by adding 7 parts of sodium carbonate, the deposited salts are filtered off, and the water is expelled at normal pressure. 2750 parts of suberodinitrile, boiling at 126° to 128° C./0.6 mm. Hg, are distilled off under reduced pressure.

The effect of the above-described purifying method becomes evident from the behavior of the suberodinitrile in continuous hydrogenation. Such hydrogenation is carried out, for example, in a reaction tube of 3 m. length and 32 mm. internal width which is filled with 1.8 liters of a suitable hydrogenation catalyst. The vaporized suberodinitrile is used in admixture with ammonia in a volume ratio of 1:5. The hydrogen pressure is 300 atmospheres. The throughput is 2.4 liters of liquid suberodinitrile per day.

(a) If a suberodinitrile is hydrogenated which has been purified by simple distillation (i.e., without the addition of a bisulfate and of water), the yield of octamethylenediamine falls from 84% to 0% within 3½ days, while the proportion of undesirable high-boiling by-products increases.

(b) If, however, a suberodinitrile is used which has been purified in the above-described manner, the yield of octamethylenediamine remains practically constant and, for example after 21 days, is 95.7%.

If, after this time, the reaction tube is charged with the suberodinitrile described under (a), the yield of octamethylenediamine decreases to as little as 33.2% within 20 hours.

*Example 5*

30 parts of sodium bisulfate and 150 parts of water are added to 3000 parts of heptadecane dicarboxylic acid dinitrile with a pH-value of 6.97. The mixture is agitated for 10 minutes at 150° C. The pH-value is then 2.5. The pH-value is adjusted to 6.8 by adding 53 parts of sodium carbonate, the deposited salts are filtered off, and the water is expelled. 2700 parts of heptadecane dicarboxylic acid dinitrile, boiling at 175° to 198° C./0.4 mm. Hg, are distilled off under reduced pressure.

The product is hydrogenated at 90° C. and at a hydrogen pressure of 300 atmospheres, in the reaction tube described in Example 4. The yield of diamine remains practically constant for three weeks and is between 92.3 and 97.0%.

If an attempt is made to hydrogenate, under the same conditions, heptadecane dicarboxylic acid dinitrile which has been purified by simple distillation, conversion ceases after as little as one day.

The process according to this invention is very simple and economical, since no appreciable expenditure of apparatus and power is required and only small amounts of cheap materials—bisulfates and, if desired, an alkali carbonate—are necessary. Formation of difficultly filterable precipitates is not observed. Corrosion is only slight because the greater part of the bisulfates is rapidly converted into the neutral salts. Undesirable impurities contained in the dinitriles, such as 2-cyanocyclopentene-(1)-yl-amine, are removed and the dinitriles converted into a state in which they can be directly hydrogenated in continuous operation. A further advantage of the new process resides in the fact that amines obtained from dinitriles which have been purified according to the invention have less tendency to turn yellow than amines obtained from dinitriles which have been purified in the conventional manner. Saponification of nitrile groups is not observed. It is surprising that in bisulfates there should be found substances which, possibly by reason of a favorable pH-range which is set up after their addition to the substances to be purified, remove the impurities in a way not hitherto achieved and without attacking the nitriles themselves. A further advantage of the process according to the invention consists in the fact that the neutral sulfates, which form during treatment of the crude nitriles and subsequent neutralization, often separate in crystalline form and absorb a considerable proportion of water from the reaction mixture (water of crystallization). Working up of the mixture is thus facilitated.

We claim:

1. A process for the removal of impurities from crude dinitriles having a hydrocarbon structure containing from 4 to 22 carbon atoms, said dinitriles consisting of two nitrile groups connected by a saturated hydrocarbon radical of at least two carbon atoms, which process comprises: contacting said crude dinitriles with from 0.01% to 10% by weight with reference to said dinitriles of a bisulfate salt selected from the group consisting of sodium bisulfate, potassium bisulfate, ammonium bisulfate, magnesium bisulfate, iron bisulfate, manganese bisulfate, zinc bisulfate, cobalt bisulfate, nickel bisulfate, and ammonium bisulfates N-substituted by 1 to 3 alkyl with 1 to 4 carbon atoms, said N-substituted ammonium bisulfates being otherwise unsubstituted, in the presence of from 1% to 20% by weight of water with reference to said dinitrile, and thereafter distilling off the purified dinitrile.

2. A process for the removal of impurities from crude dinitriles having a hydrocarbon structure containing from 4 to 22 carbon atoms, said dinitriles consisting of two nitrile groups connected by a saturated hydrocarbon radical of at least two carbon atoms, which process comprises: contacting said crude dinitriles with from 0.01% to 10% by weight with reference to said dinitriles of a bisulfate salt selected from the group consisting of sodium bisulfate, potassium bisulfate, ammonium bisulfate, magnesium bisulfate, iron bisulfate, manganese bisulfate, zinc bisulfate, cobalt bisulfate, nickel bisulfate, and ammonium bisulfates N-substituted by 1 to 3 alkyl with 1 to 4 carbon atoms, said N-substituted ammonium bisulfates being otherwise unsubstituted, in the presence of from 1% to 20% by weight of water with reference to said dinitrile, neutralizing the reaction mixture, and thereafter distilling off the purified dinitrile.

3. A process as in claim 2 wherein the amount of bisulfate salt is between 0.1% and 5% by weight with reference to the dinitrile and wherein the amount of water is between 3% and 8% by weight with reference to said dinitrile.

4. A process for removing 2-cyanocyclopentene-(1)-yl-amine from crude adipodinitrile which comprises: contacting said crude adipodinitrile with a bisulfate salt selected from the group consisting of sodium bisulfate, potassium bisulfate, ammonium bisulfate, magnesium bisulfate, iron bisulfate, manganese bisulfate, zinc bisulfate, cobalt bisulfate, nickel bisulfate, and ammonium bisulfates N-substituted by 1 to 3 alkyl with 1 to 4 carbon atoms, said N-substituted ammonium bisulfates being otherwise unsubstituted, in the presence of from 1% to 20% by weight of water with reference to said adipodinitrile, and thereafter distilling off the purified dinitrile.

5. A process for removing 2-cyanocyclopentene-(1)-yl-amine from crude adipodinitrile which comprises: contacting said crude adipodinitrile with a bisulfate salt selected from the group consisting of sodium bisulfate, potassium bisulfate, ammonium bisulfate, magnesium bisulfate, iron bisulfate, manganese bisulfate, zinc bisulfate, cobalt bisulfate, nickel bisulfate, and ammonium bisulfates N-substituted by 1 to 3 alkyl with 1 to 4 carbon atoms, said N-substituted ammonium bisulfates being otherwise unsubstituted, in the presence of from 1% to 20% by weight of water with reference to said adipodinitrile, neutralizing the reaction mixture, and thereafter distilling off the purified dinitrile.

6. A process as in claim 5 wherein the amount of bisulfate salt is from 0.1% to 5% by weight with reference to the adipodinitrile and wherein the amount of water is between 3% and 8% by weight with reference to said adipodinitrile.

7. A process as in claim 6 wherein said bisulfate salt is sodium bisulfate.

References Cited by the Examiner

UNITED STATES PATENTS

| | | | |
|---|---|---|---|
| 2,242,309 | 5/1941 | Lazier et al. | 260—465.8 |
| 2,305,103 | 12/1942 | Osgood | 260—465.8 |
| 2,768,132 | 10/1956 | Halliwell | 202—57 |

FOREIGN PATENTS 731,458  6/1955  Great Britain.

OTHER REFERENCES

Bergmann: "The Chemistry of Acetylene and Related Compounds," page 80, 1948.

CHARLES B. PARKER, *Primary Examiner.*